(12) United States Patent
Kovie et al.

(10) Patent No.: US 11,618,305 B1
(45) Date of Patent: Apr. 4, 2023

(54) VEHICLE BODY STRUCTURE

(71) Applicant: NISSAN NORTH AMERICA, INC., Franklin, TN (US)

(72) Inventors: David Kovie, Livonia, MI (US); Mahiuddin Ahmed, Troy, MI (US); Christopher Herrala, Milford, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/499,806

(22) Filed: Oct. 12, 2021

(51) Int. Cl.
B60J 5/04 (2006.01)
E05B 85/12 (2014.01)

(52) U.S. Cl.
CPC .......... *B60J 5/0468* (2013.01); *B60J 5/0456* (2013.01); *E05B 85/12* (2013.01)

(58) Field of Classification Search
CPC ........ B60J 5/0468; B60J 5/0456; E05B 85/12
USPC .................................................. 296/187.12
See application file for complete search history.

(56) References Cited

U.S. PATENT DOCUMENTS

| 8,414,038 | B2* | 4/2013 | Bedekar | E05B 77/04 |
| | | | | 292/216 |
| 9,187,937 | B2* | 11/2015 | Schryer | E05B 85/12 |
| 2016/0053519 | A1* | 2/2016 | Och | E05B 85/12 |
| | | | | 292/336.3 |
| 2020/0232260 | A1* | 7/2020 | Schmitz | B60J 5/0416 |

FOREIGN PATENT DOCUMENTS

WO WO-2021064012 A1 * 4/2021 ............... B63B 1/30

* cited by examiner

*Primary Examiner* — Joseph D. Pape
(74) *Attorney, Agent, or Firm* — Global IP Counselors, LLP

(57) ABSTRACT

A door structure is moveable to and from of a closed orientation covering a door opening and an open orientation exposing the door opening of a vehicle. The door structure has an inner door panel with an interior latch handle attachment area and an attenuation slot adjacent to the interior latch handle attachment area. The attenuation slot is defined between a first slot edge and a second slot edge. The interior latch handle is installed to the interior latch handle attachment area. A portion of the interior latch handle is located adjacent to the first slot edge of the attenuation slot. In response to an impact event proximate a central area of the door structure, the door structure and the interior latch handle attachment area deform such that the first slot edge and the interior latch handle move relative to the second slot edge of the attenuation slot.

18 Claims, 10 Drawing Sheets

VEHICLE BODY STRUCTURE

BACKGROUND

Technical Field

The present disclosure generally relates to a vehicle body structure. More specifically, the present disclosure relates to a vehicle body structure with an inner door panel that includes an attenuation slot adjacent to an interior door handle such that in response to an impact event where impact forces deform a central area of the door, the attenuation slot attenuates movement of the interior door handle resulting from impact related deformation of the inner door panel.

Background Information

Vehicle body structures, such as doors are provided with interior door handles that area mechanically connected to door latch mechanisms. In a closed position, one end of a door having an interior door handle and a door latch mechanism is fixed to the vehicle body structure by heavy duty hinges. An opposite end of the door is releasably latched to an adjacent pillar of the vehicle body structure by the door latch mechanism. In response to an impact event where the door of the vehicle is impacted by an impacting force, it is advantageous to keep the door of the vehicle in a closed orientation so that the adjacent pillars that support the door can absorb a portion of the impacting forces.

SUMMARY

One object of the present disclosure is to prevent a vehicle door from opening during an impact event.

In view of the state of the known technology, one aspect of the present disclosure is to provide a vehicle body structure with a door structure and an interior latch handle. The door structure is configured to attach to a vehicle and move to and from each of a closed orientation covering a door opening of the vehicle and an open orientation exposing the door opening when attached to the vehicle. The door structure has an inner door panel defining an interior latch handle attachment area and an attenuation slot adjacent to the interior latch handle attachment area. The attenuation slot is defined between a first slot edge and a second slot edge. The interior latch handle is installed to the interior latch handle attachment area of the inner door panel. A portion of the interior latch handle is located adjacent to the first slot edge of the attenuation slot such that with the door structure in a non-deformed state the interior latch handle is in a generally upright orientation and the first slot edge is adjacent to the second slot edge. In response to an impact event proximate a central area of the door structure, the door structure and the interior latch handle attachment area deform such that the first slot edge and the interior latch handle move relative to the second slot edge of the attenuation slot.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
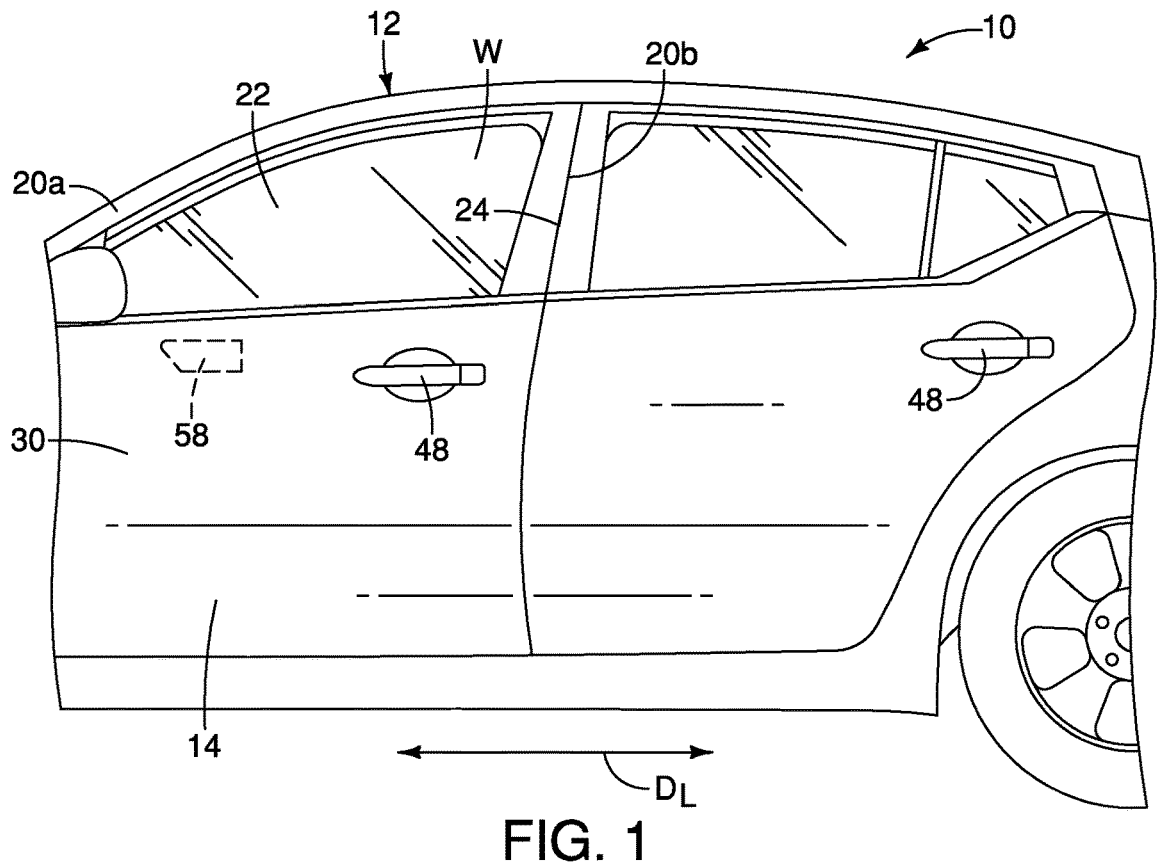
FIG. 1 is a side view of a vehicle that includes a door structure with an interior latch handle showing the door structure in a closed orientation in accordance with a first embodiment.
Figure 2:
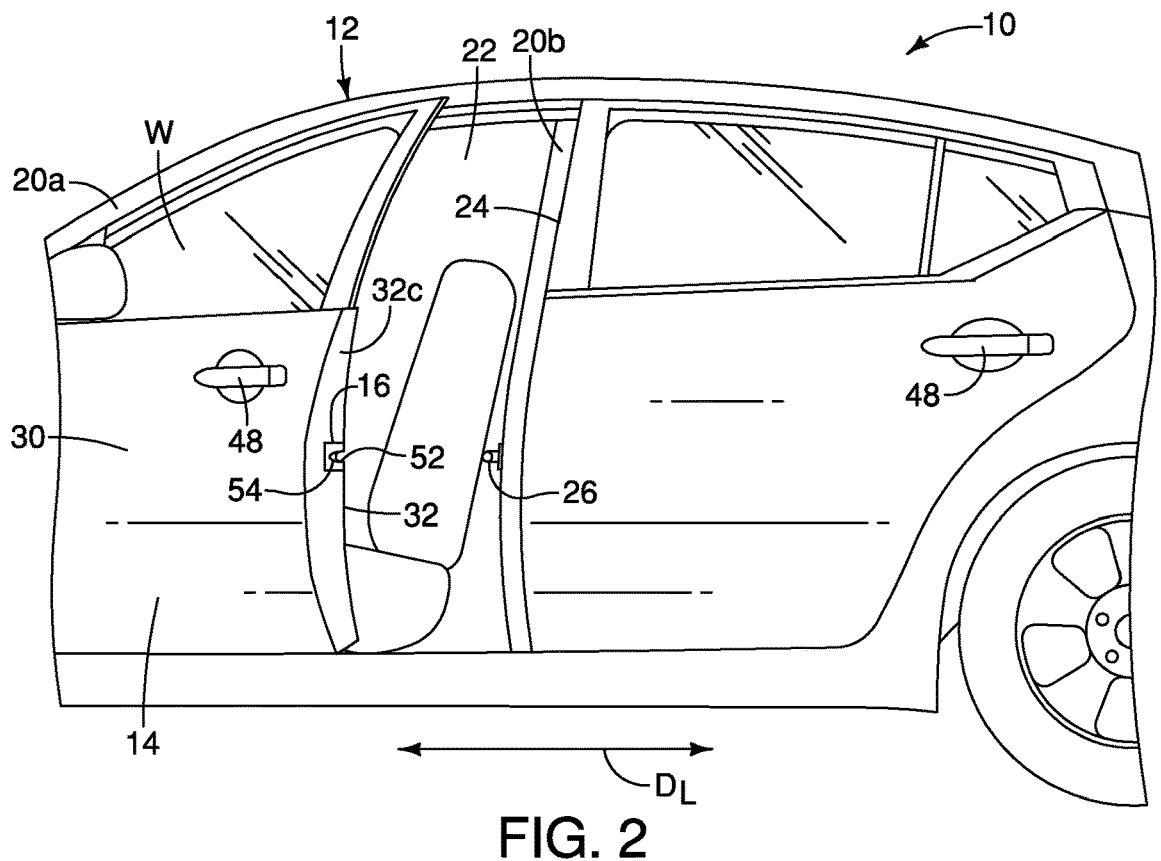
FIG. 2 is another side view of the vehicle showing the door structure in an open orientation in accordance with the first embodiment.

Referring initially to FIGS. 1 and 2, a vehicle 10 is illustrated in accordance with a first embodiment that includes a vehicle body structure 12. The vehicle body structure 12 includes a door 14 with a door latch mechanism 16 and an interior latch handle 18 (FIG. 1).

The vehicle body structure 12 also includes, among other features, an A-pillar 20a, a B-pillar 20b, a passenger compartment 22 and a door opening 24 defined between the A-pillar 20a and the B-pillar 20b. The door opening 24 provides access to the passenger compartment 22. The door 14 (also referred to as the door structure 14) is attached to the A-pillar 20a of the body vehicle structure 12 such that it is movable to and from each of a closed orientation (FIG. 1) covering the door opening 24 and an open orientation exposing the door opening 24 (FIG. 2). As shown in FIG. 2, the vehicle body structure 12 further includes a latch striker 26 that is attached to, for example, the B-pillar 20b of the vehicle body structure 12.

Figure 8:
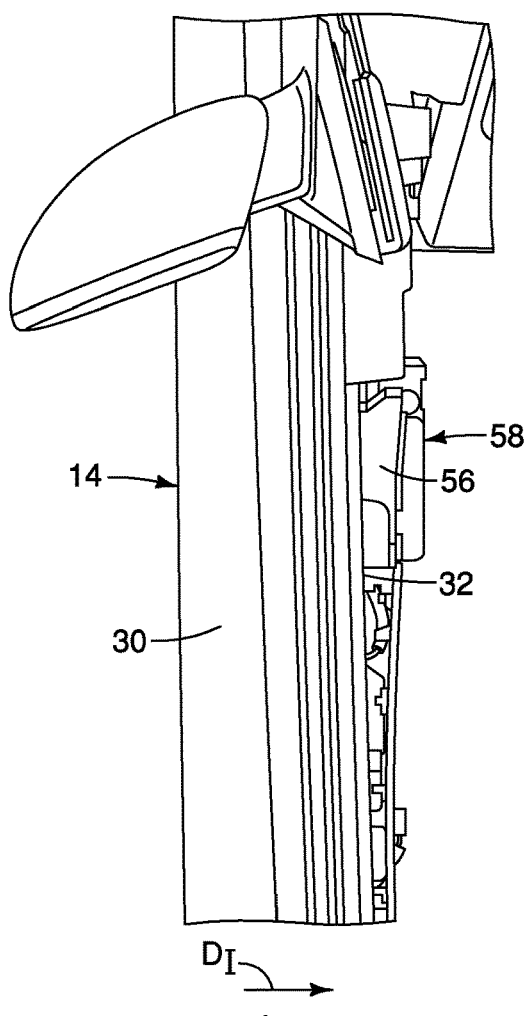
FIG. 8 is a top view of the door structure showing the door structure in a normal state (factory state) in accordance with the first embodiment.
Figure 9:
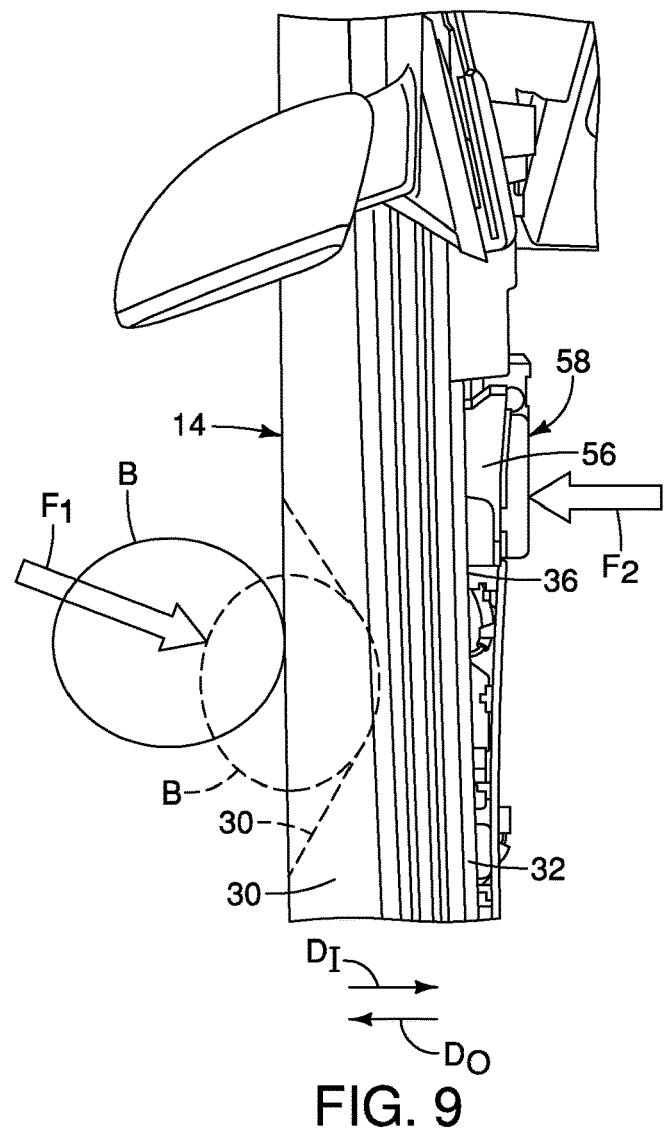
FIG. 9 is another top view of the door structure similar to FIG. 8 showing the door structure during an impact event where a barrier impacts a central area of the outboard side of the door structure in accordance with the first embodiment.

The vehicle body structure 12 defines a vehicle longitudinal direction DL, as shown in FIGS. 1 and 2. The vehicle body structure 12 also defines vehicle inboard direction $D_I$ and vehicle outboard directions $D_O$ as shown in FIGS. 8 and 9. The vehicle inboard direction $D_I$ and the vehicle outboard directions $D_O$ are defined relative to a lengthwise center line (not shown) of the vehicle 10 and are generally perpendicular to the vehicle longitudinal direction DL.

Figure 3:
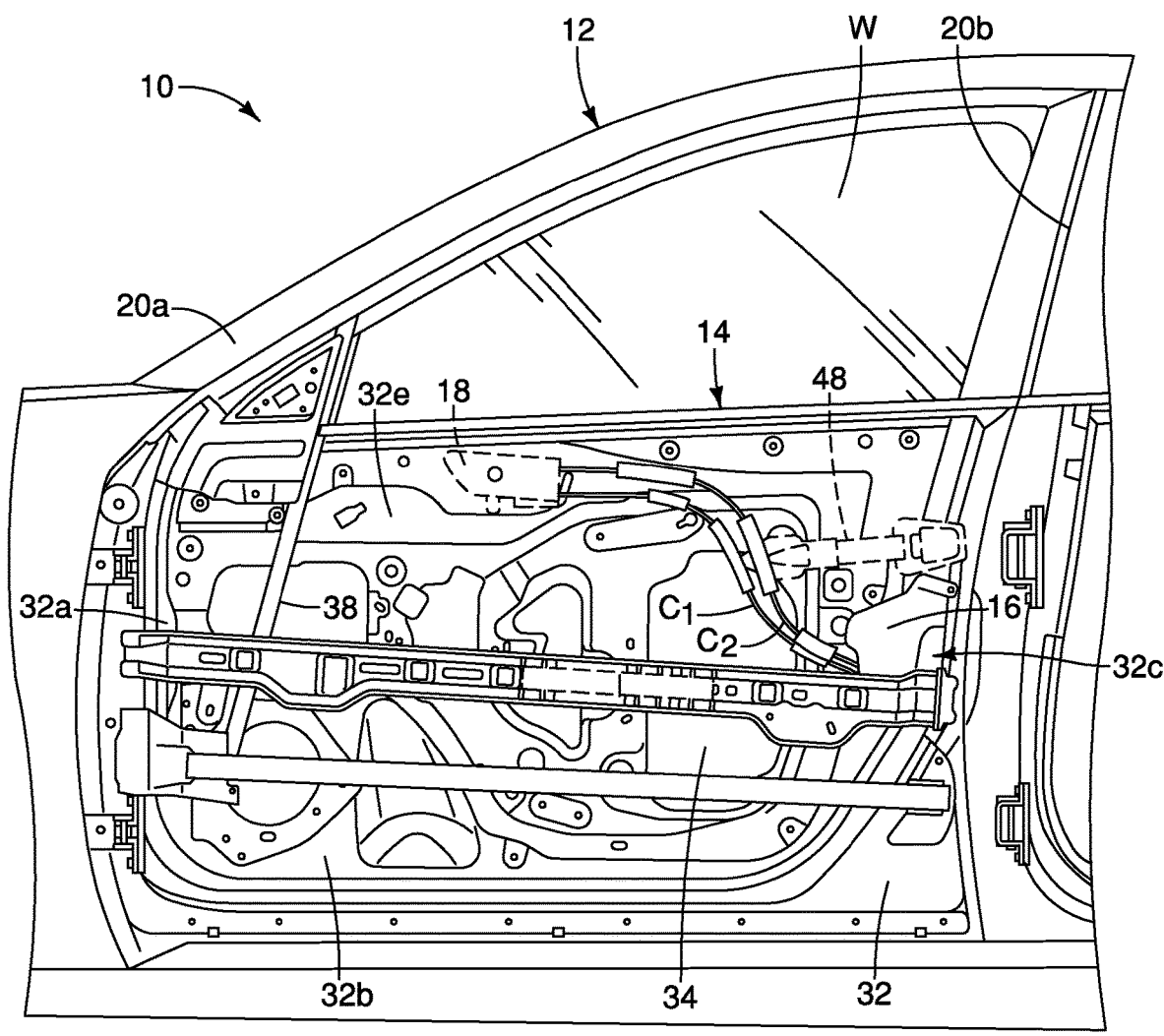
FIG. 3 is another side view of the vehicle with an outer panel of the door structure removed showing an inner door panel, a latch mechanism and the interior door handle of the door in accordance with the first embodiment.
Figure 4:
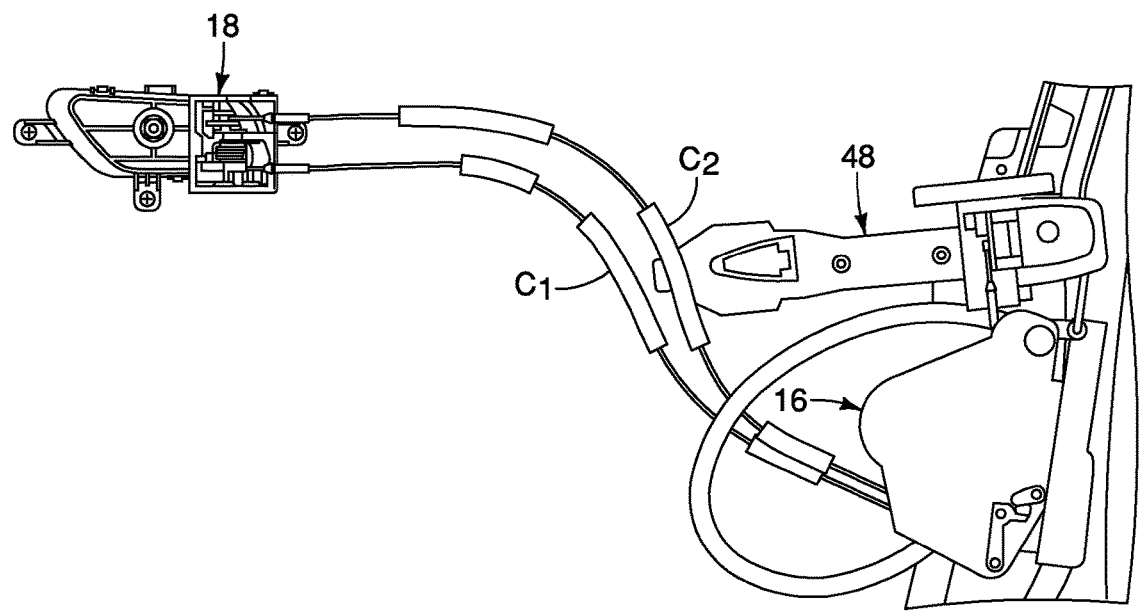
FIG. 4 is a side view of the latch mechanism and the interior door handle removed from the door in accordance with the first embodiment.
Figure 5:
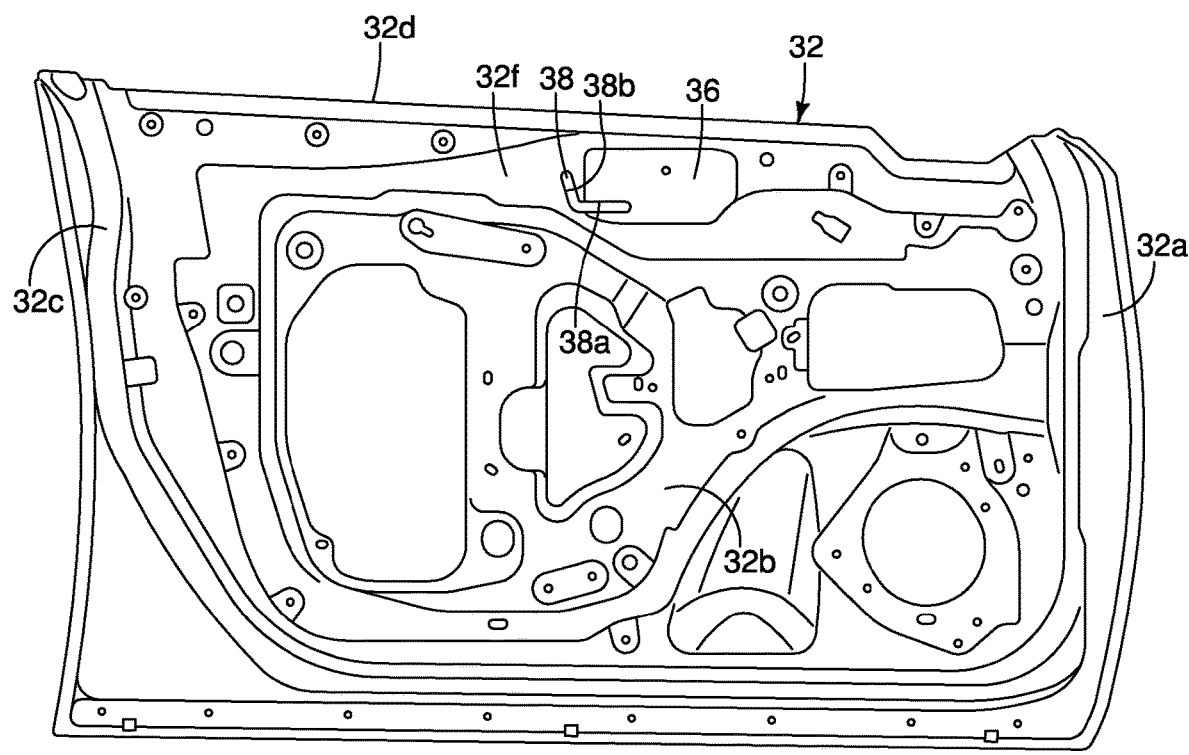
FIG. 5 is view of an inboard side view of the inner door panel removed from the door structure showing an interior latch handle attachment area (an interior area) and an attenuation slot adjacent to the interior latch handle attachment area in accordance with the first embodiment.
Figure 6:
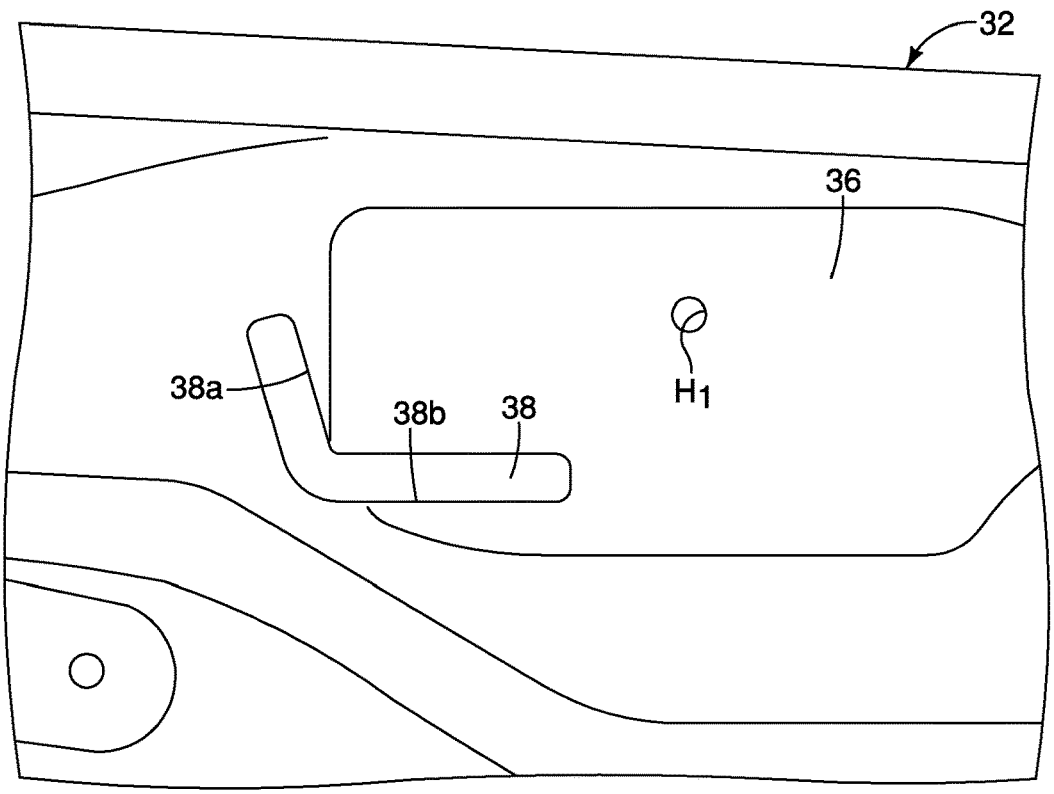
FIG. 6 is a side view of a portion of the inboard side of the inner door panel shown in FIG. 5 showing the interior latch handle attachment area (the interior area) and the attenuation slot in accordance with the first embodiment.
Figure 10:
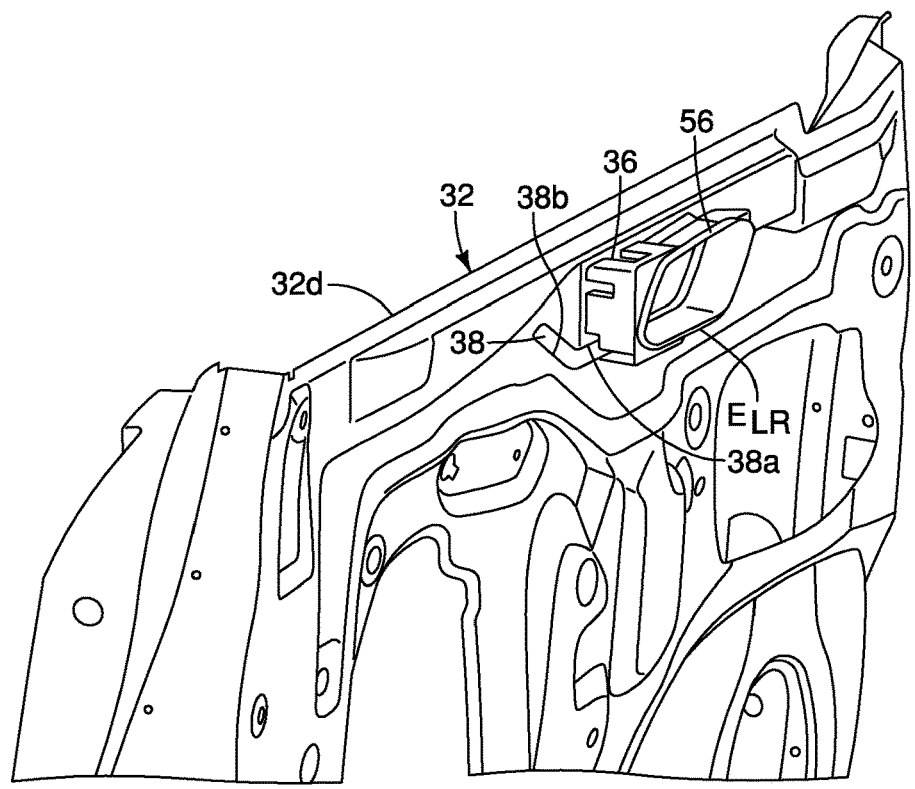
FIG. 10 is a perspective view of the interior side of the inner door panel shown removed from the door structure in a non-impacted state in accordance with the first embodiment.
Figure 11:
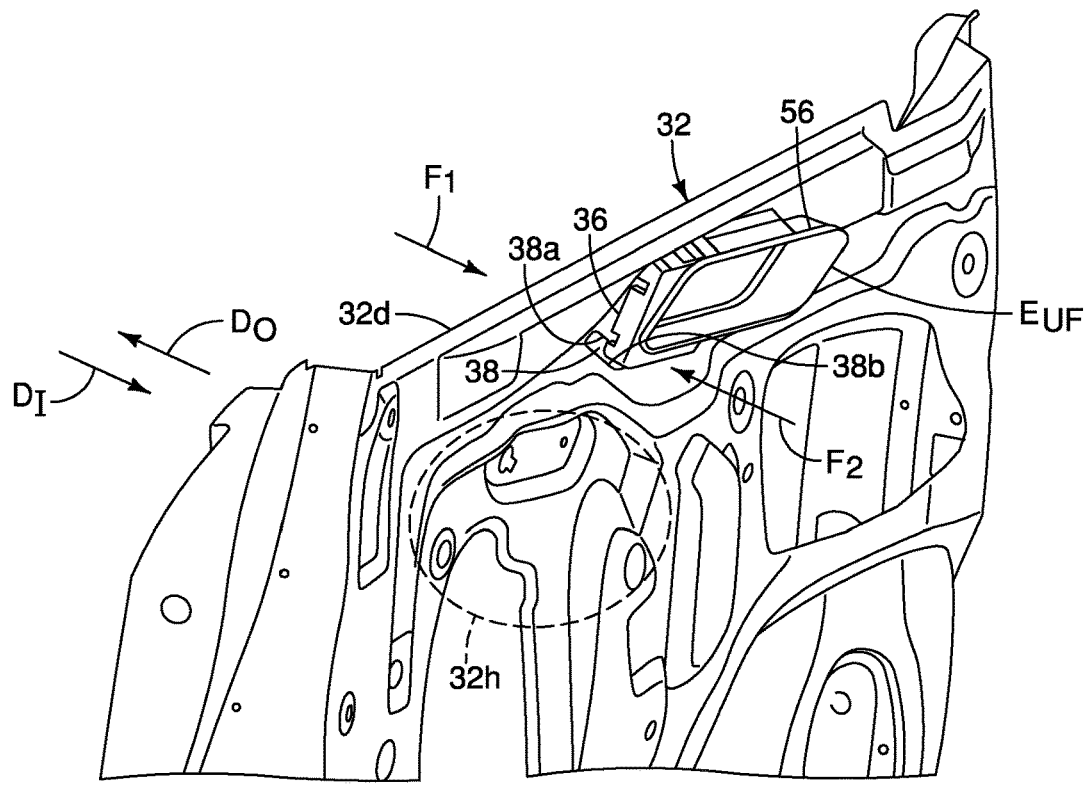
FIG. 11 is another perspective view of the interior side of the inner door panel similar to FIG. 10 showing inner door in an impacted state during or after the impact event depicted in FIG. 9, with a lower slot edge of the attenuation slot moved further in an inboard direction that an upper slot edge of the attenuation slot of the inner door panel in accordance with the first embodiment.

The door structure 14 includes an outer door panel 30 (FIGS. 1, 2, 8-9, 12-13 and 16) and an inner door panel 32 (FIGS. 3 and 5-17). The outer door panel 30 is fixedly attached to the inner door panel 32 in a conventional manner (for example, welding techniques) defining a hollow interior 34 therebetween, as shown in FIGS. 3, 4 and 11.

The inner door panel 32 has a forward section 32a, a main panel portion 32b and a rearward section 32c. The forward section 32a extends vertically along a forward end of the main panel portion 32a. The rearward section 32c extends along a rearward end of the main panel portion 32b with the hollow interior 34 of the door structure 14 being at least partially defined along the main panel portion 32b between the forward section 32a and the rearward section 32c. The main panel portion 32b of the inner door panel 32 includes an inboard area 36 (an interior latch handle attachment area 36). The inboard area 36 is located near an upper edge 32d of the inner door panel 32. The inboard area 36 further includes an attachment hole $H_1$ that is configured to receive a mechanical fastener $F_1$. As described further below, the interior latch handle 18 is installed to the inboard area 36 (the interior latch handle attachment area 36) via the mechanical fastener $F_1$. Hence, inboard area 36 can also be referred to as the interior latch handle attachment area 36.

The inner door panel 32 is provided with an attenuation slot 38 that extends from an area rearward and adjacent to the inboard area 36 along a lower portion of the inboard area 36. In the first embodiment, the attenuation slot 38 has an overall L-shape as viewed from an inboard side 32f of the inner door panel 32. The lower portion of the attenuation slot 38 (the horizontal portion of the L-shape) extends from rearward of the inboard area 36 along a lower section of the inboard area extending about a third of the overall length of the inboard area 36.

The attenuation slot 38 is defined between a first slot edge 38a and a second slot edge 38b. The first slot edge 38a defines a forward and upper boundary of the attenuation slot 38. The second slot edge 38b defines a rearward and lower boundary of the attenuation slot 38.

The attenuation slot 38 is basically an extended or elongated opening in the inner door panel 32 that extends from an outboard side 32e to an inboard side 32f of the inner door panel 32. As is described in greater detail below, in response to an impact event where an impacting force is applied proximate a central area of the outer panel 30 of the door structure 14, the door structure 14 and the interior area 36 can deform at a rate that differs from deformation of the second slot edge 38b of the attenuation slot 38. Or, put another way, the first slot edge 38a can undergo limited inboard movement while the second slot edge 38b has more freedom to undergo deformation inboard (movement in the inboard direction).

A window regulator mechanism 40 is installed to the inner door panel 32 in a conventional manner such that a window W is movable from a lowered position (not shown) within the hollow interior 34 and a raised position (FIGS. 1-3) by the window regulator mechanism 40.

The door structure 14 further defines a window receiving slot S (FIG. 16) between respective upper ends an upper edge 30a of the outer door panel 30 and an upper edge 32g of the inner door panel 32.

A description of the door latch mechanism 16 (also referred to as the latch mechanism 16) is provided now with specific reference to FIGS. 2-4. The latch mechanism 16 is installed to the rearward area 32c of the inner door panel 32, as shown in FIG. 3. The latch mechanism 16 is connected to the interior latch handle 18 via cables $C_1$ and $C_2$, and further connected to an exterior latch handle 48 via a separate cable. The latch mechanism 16 is configured such that in a latching orientation, the latch mechanism 16 retains the door structure 14 in the closed orientation and in a release orientation the door structure 14 can move to the open orientation. As shown in FIG. 2, the latch mechanism 16 includes a slot 52 and a latch catch 54 that is partially visible in the slot 52. The latch catch 54 is configured to lock on to the striker 26 when the door 14 is in the closed orientation and release the striker 26 when the latch mechanism 16 operated to release the latch catch 54 from the striker 26 allowing the door 14 to be moved to the open orientation.

The internal operating mechanism (not shown) of the latch mechanism 16 includes conventional mechanical components that are well known in the art. Therefore, further description of the latch mechanism 16 is omitted for the sake of brevity.

As shown in FIG. 4, the interior latch handle 18 is operably connected to the latch mechanism 16 via cables $C_1$ and $C_2$ in a conventional manner. The cables $C_1$ and $C_2$ are located within the hollow interior 34 of the door 14. The exterior latch handle 48 is installed to the outer door panel 30 in a conventional manner and is also operably connected to the latch mechanism 16 via a cable in a conventional manner.

As shown in FIGS. 1, 2, 7-13 and 16-17, the interior latch handle 18 is installed to the inboard area 36 of the inner door panel 32. The interior latch handle 18 has a housing 56 and a release lever 58 supported to the housing 56 for pivotal movement about a pivot pin (not shown) between an at rest orientation and a door opening orientation (not shown). The housing 56 is directly attached to the inboard area 36 via a mechanical fastener $F_1$ that threads into the attachment hole $H_1$ of the inner door panel 32. The housing 56 includes several attachment tabs that receive fasteners F. The fasteners F attached to an interior trim panel (the interior trim panel is not shown in order to provide a better view of the slot 38). The interior trim panel is a conventional vehicle component that attaches to and covers most if not all of the inboard side 32f of the inner door panel 32. Therefore, further description is omitted for the sake of brevity.

The release lever 58 is operably connected to the latch mechanism 16 via the cables $C_1$ and $C_2$ such that when the release lever 58 is moved to the door opening orientation, the latch mechanism 16 releases the door structure 14 such that the door structure 14 can move to the open orientation. The release lever 58 is biased to return to the at rest orientation by a spring (not shown) such that if the door is moved to the closed orientation, the latch mechanism 16 can retain and lock the door structure 14 in the closed orientation.

FIGS. 8 and 9 show the door 14 before (FIG. 8) and after (FIG. 9) a barrier B approaches the door 14 impacts the door 14 during an impact event. Specifically, the barrier B impacts a central area of the outer door panel 30. The outer door panel 30 deforms, as shown in phantom lines in FIG. 9. The impact forces associated with the impact event with the barrier B further impact and can deform other structural elements within the door 14, such as the inner panel 32 of the door 14, as described in greater detail below.

In certain circumstances, the impact event can cause the release lever 58 to move from the at rest orientation (door close orientation) shown in FIG. 8 to the door opening orientation (not shown). During such an impact event, it is desirable to have the door 14 remain in the closed orientation so that a portion of the impact forces of the impact event is transmitted through the latch mechanism 16 to the B-pillar 20b and other portions of the vehicle body structure 12. Consequently, it is desirable to have the release lever 58 to remain in the at rest orientation so that the door 14 can remain shut. The inclusion of the attenuation slot 38 provides a break line in the propagation of deformation of the inner door panel 32. Specifically, in the absence of other forces acting thereon, an area 32h (circled with a phantom line in FIG. 11) of the inner door panel 32 typically undergoes more significant amounts of deformation in the inboard direction $D_I$ during the impact event depicted in FIG. 9 than areas forward or rearward areas of the area 32h of the inner door panel 32. FIG. 10 shows the inner door panel 32 in a non-deformed state. The second slot edge 38b is continuous with the area 32h of the inner door panel 32. Therefore, the portions of the inner door panel 32 rearward and below the second slot edge 38b undergo some deformation. However, the portions of the inner door panel 32, and, in particular, the inboard area 36 may undergo some deformation in the inboard direction $D_I$ but does not undergo the amount of deformation as the areas below and rearward of the attenuation slot 38. In other words, with the impact event only applying impact forces to the door 14 rearward of the inboard area 36 and the interior latch handle 18), the second slot edge 38b will undergo more inboard movement due to deformation than the first slot edge 38b.

As shown in FIGS. 9, 11, 13, 15 and 17, an interior object or structure within the passenger compartment 22 is represented by the arrow $F_2$. The interior object $F_2$ is either fixed in place within the vehicle 10 or is relatively immobile relative to the vehicle 10 and the door 14. During an impact event, such as that shown in FIG. 9, the forces $F_1$ of the barrier B deform portions of the door 14 and the interior object $F_2$ can contact the lower rearward edge $E_{LR}$ of the housing 56 of the interior latch handle 18 during such an impact event. The presence of the interior object $F_2$ also limits movement of the housing 56 of the interior latch handle 18 in the inboard direction $D_I$.

Figure 7:
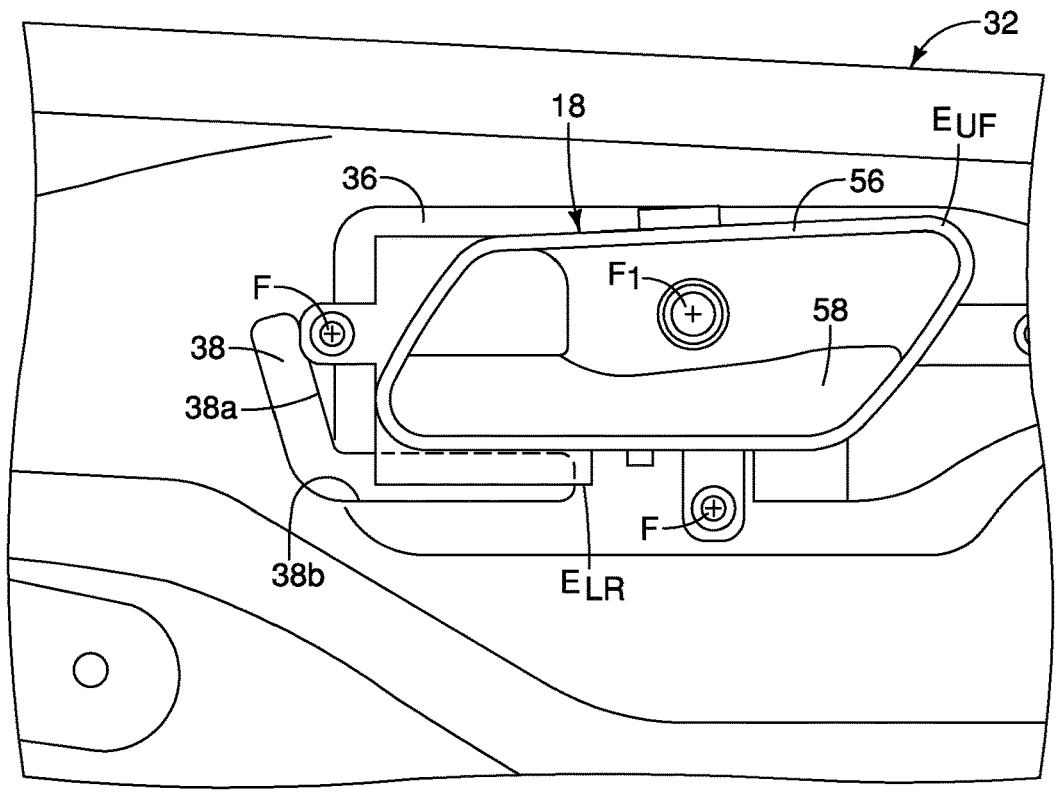
FIG. 7 is another side view of the portion of the inboard side of the inner door panel shown in FIG. 5 showing the interior latch handle fixed to the interior latch handle attachment area (the interior area) of the inner door panel in accordance with the first embodiment.

As shown in FIG. 7, a majority of the housing 56 of the interior latch handle 18 overlays the inboard area 36 of the inner door panel 32. Further, the lower rearward edge $E_{LR}$ also overlays a portion of the attenuation slot 38. The location of the slot 38 is strategic in that in the presence of the interior object $F_2$, the slot 38 provides attenuation of the deformation of the inboard area 36 relative to the deformation of more central areas of the inner door panel 32. Further, the location of the slot 38 attenuates the deformation of the inboard area 36 allows the interior latch handle 18 to avoid absorbing impact energy from the interior object $F_2$. It has been discovered that if the lower rearward edge $E_{LR}$ and of the interior latch handle 18 can move in an outboard direction relative to the area 32h of the inner door panel 32 during an impact event, the possibility of the interior latch handle 18 causing the door 14 to open is minimized and in most circumstances, eliminated.

During an impact event, such at that demonstrated in FIG. 9, the impact force $F_1$ of the barrier B causes deformation of portions of the inner door panel 32 in the inboard direction $D_I$. Simultaneously, the fixed position of the interior object $F_2$ can be considered a force opposing the force $F_1$ of the barrier B. The opposing force from the interior object $F_2$ causes deformation of the inner door panel 32 in an outboard direction $D_O$ relative to the lower rearward edge $E_{LR}$ of the slot 38. A comparison of FIGS. 10 and 11, of FIGS. 12 and 13, of FIGS. 14 and 15 and of FIGS. 16 and 17 demonstrate the complexity of the resulting deformation. FIG. 10 shows the inner door panel 32 removed from the door 14 prior to an impact event. FIG. 11 shows the inner door panel 32 after an impact event. A comparison of the location and orientation of the housing 56 of the interior latch handle 18 in FIGS. 10 and 11 shows that in FIG. 11, the lower rearward corner $E_{LR}$ of the housing 56 and the first slot edge 38a have moved in the outboard direction relative to the lower rear edge 38b of the inner door panel 32. Meanwhile the lower rear edge 38b of the inner door panel 32 has moved in the inboard direction $D_I$. Meanwhile, the upper front corner $E_{UF}$ of the housing 56 has moved in the inboard direction $D_I$.

Figure 12:
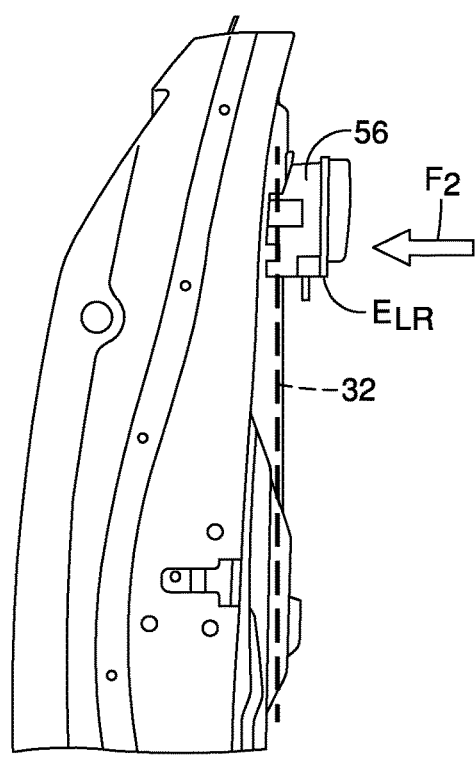
FIG. 12 is a rear view of the door structure looking in a vehicle forward direction with the door structure shown removed from the vehicle in a non-impacted state in accordance with the first embodiment.
Figure 13:
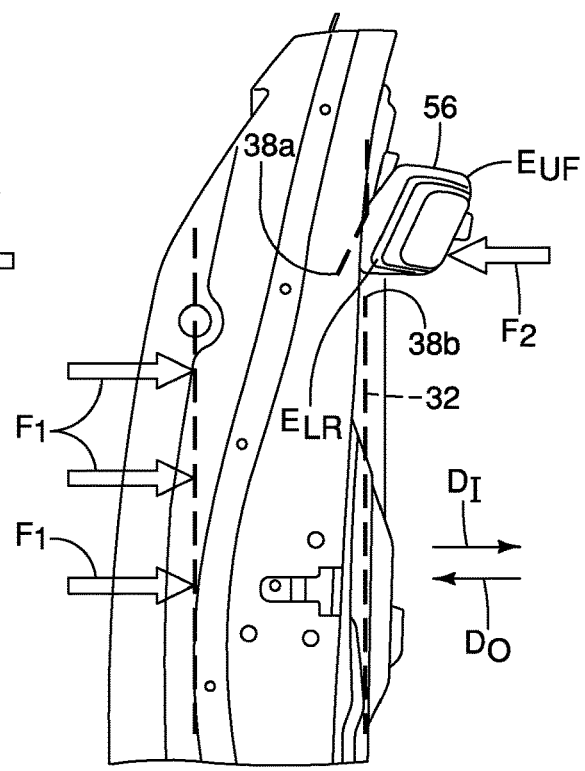
FIG. 13 is another rear view of the door structure similar to FIG. 12 schematically showing the interior latch handle attachment area (the interior area) of the inner door panel in an impacted state during or after the impact event depicted in FIG. 9, with a lower slot edge of the attenuation slot moved further in an inboard direction that an upper slot edge of the attenuation slot of the inner door panel and an upper front edge of a housing of the interior latch handle moved further inboard than a lower rear edge of the housing of the interior latch handle in accordance with the first embodiment.

FIGS. 12 and 13 are rear views looking in a vehicle forward direction at the inner door panel 32. FIG. 12 shows the door 14 prior to an impact event. FIG. 13 shows the inner door panel 32 after the impact event. FIG. 13 shows that the lower rearward corner $E_{LR}$ of the housing 56 and the first slot edge 38a have moved in the outboard direction $D_O$ relative to the lower rear edge 38b of the inner door panel 32. Meanwhile the lower rear edge 38b of the slot 38 of the inner door panel 32 has moved in the inboard direction $D_I$. Meanwhile, the upper front corner $E_{UF}$ of the housing 56 has moved in the inboard direction $D_I$.

Figure 14:
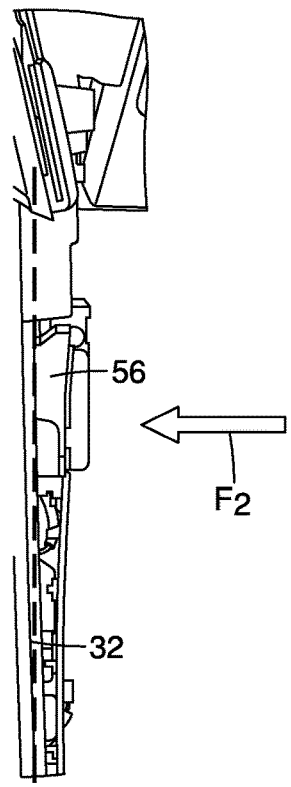
FIG. 14 is a top view of the inner door panel of the door structure looking downward showing the inner door panel and the door structure in a non-impacted state in accordance with the first embodiment.
Figure 15:
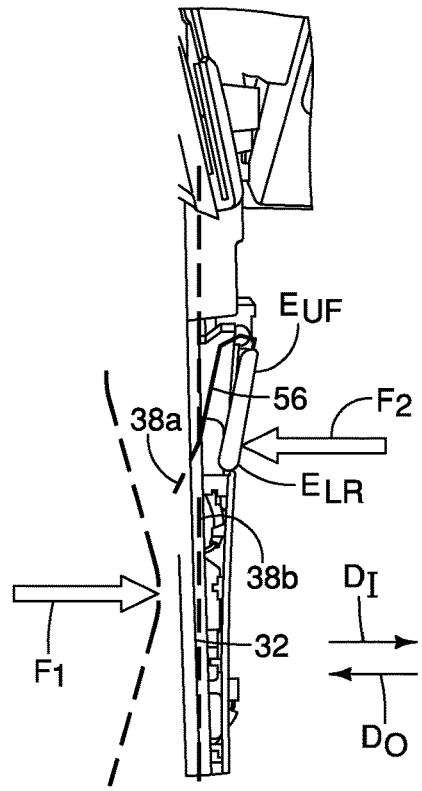
FIG. 15 is another top view of the inner door panel of the door structure similar to FIG. 14 schematically showing the interior latch handle attachment area (the interior area) of the inner door panel in an impacted state during or after the impact event depicted in FIG. 9, with the lower slot edge of the attenuation slot moved further in an inboard direction that the upper slot edge of the attenuation slot of the inner door panel and an upper front edge of a housing of the interior latch handle moved further inboard than a lower rear edge of the housing of the interior latch handle in accordance with the first embodiment.

FIGS. 14 and 15 are top views looking downward at the inner door panel 32. FIG. 14 shows the door 14 prior to an impact event. FIG. 15 shows portions of the inner door panel 32 after the impact event. FIG. 15 shows that the lower rearward corner $E_{LR}$ of the housing 56 and the first slot edge 38a have moved in the outboard direction $D_O$ relative to the lower rear edge 38b of the inner door panel 32. Meanwhile the lower rear edge 38b of the slot 38 of the inner door panel 32 has moved in the inboard direction $D_I$. Meanwhile, the upper front corner $E_{UF}$ of the housing 56 has moved in the inboard direction $D_I$.

Figure 16:
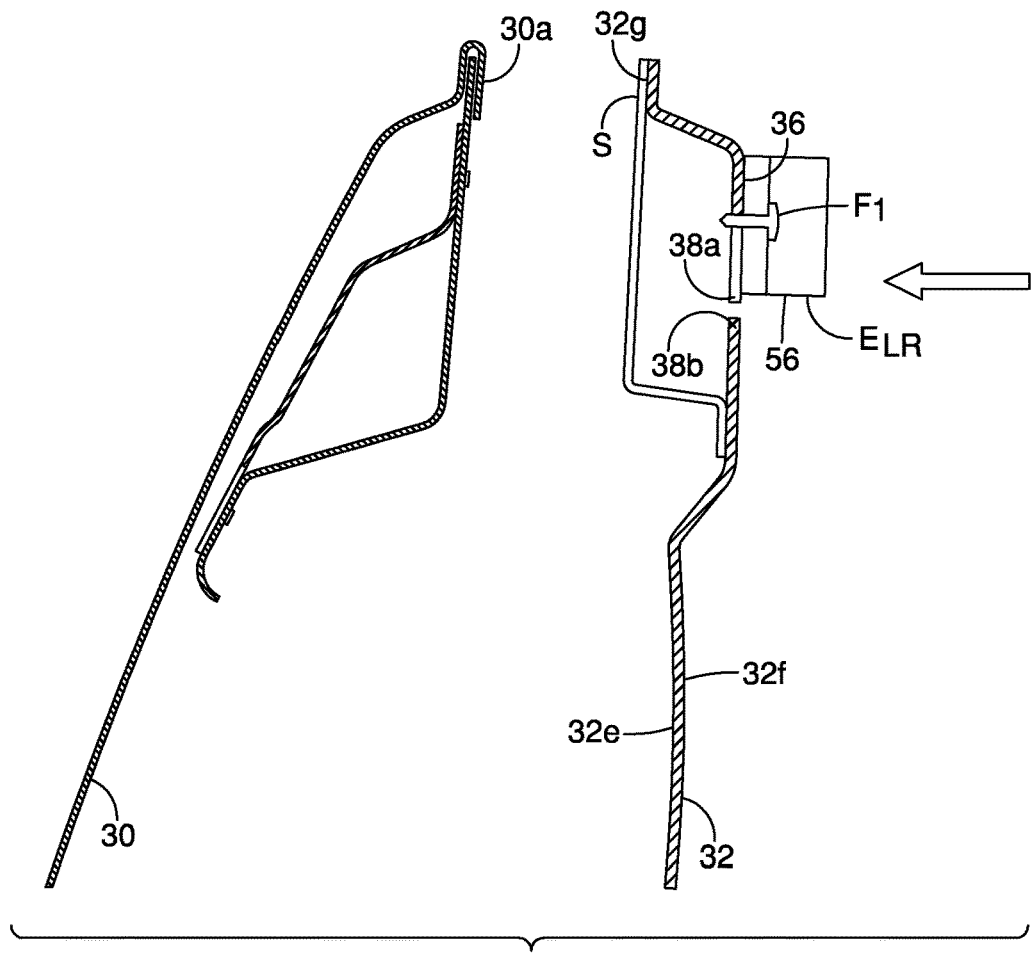
FIG. 16 is a rear cross-sectional view of the inner and outer door panels looking in a vehicle forward direction in a non-impacted state in accordance with the first embodiment.
Figure 17:
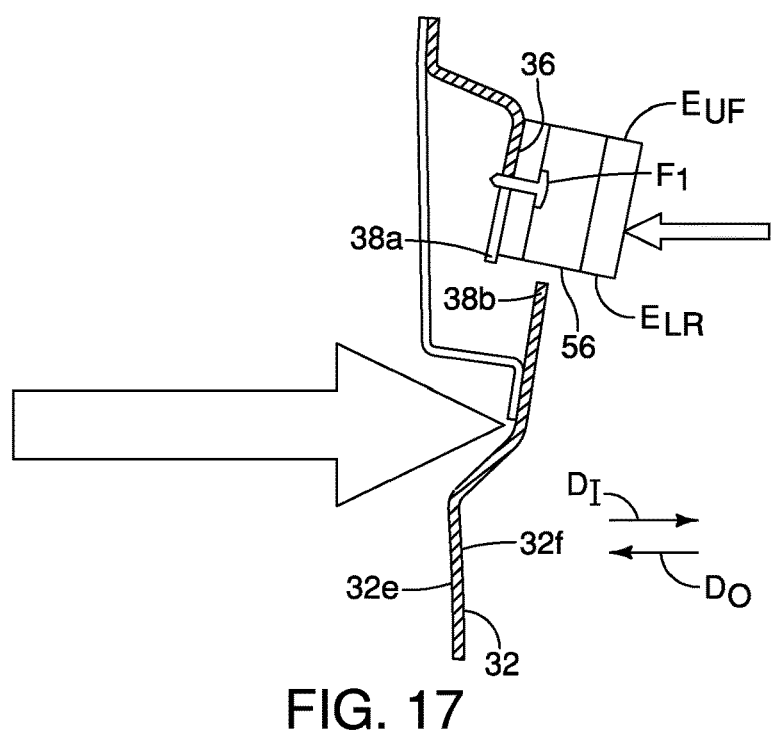
FIG. 17 is another rear cross-sectional view of the inner door panel similar to FIG. 16 schematically showing the interior latch handle attachment area (the interior area) of the inner door panel in an impacted state during or after the impact event depicted in FIG. 9, with the lower slot edge of the attenuation slot moved further in an inboard direction that the upper slot edge of the attenuation slot of the inner door panel and an upper front edge of a housing of the interior latch handle moved further inboard than a lower rear edge of the housing of the interior latch handle in accordance with the first embodiment.

FIGS. 16 and 17 are rear cross-sectional views looking in the vehicle forward direction at the inner door panel 32 and the interior latch handle 18. FIG. 16 shows the door 14 prior to an impact event. FIG. 17 shows portions of the inner door panel 32 after the impact event. FIG. 17 further shows that the lower rearward corner $E_{LR}$ of the housing 56 and the first slot edge 38a have moved in the outboard direction $D_O$ relative to the lower rear edge 38b of the inner door panel 32. Meanwhile the lower rear edge 38b of the slot 38 of the inner door panel 32 has moved in the inboard direction $D_I$. Meanwhile, the upper front corner $E_{UF}$ of the housing 56 has moved in the inboard direction $D_I$.

It should be understood from the above description that the lower rearward corner $E_{LR}$ of the housing 56, the first slot edge 38a and the lower rear edge 38b of the slot 38 of the inner door panel 32 have all moved in the inboard direction $D_I$. However, due to the presence of the interior object $F_2$ and the reactionary forces associated with the location of the interior object $F_2$, the lower rear edge 38b of the slot 38 of the inner door panel 32 has moved a greater distance in the inboard direction $D_I$, than the lower rearward corner $E_{LR}$ of the housing 56 and the first slot edge 38a. Hence, as in the above descriptions, the lower rearward corner $E_{LR}$ of the housing 56 and the first slot edge 38a appear to move in the outboard direction $D_O$ relative to the lower rear edge 38b of the slot 38 of the inner door panel 32.

Put another way, deformation related movement of the lower rearward corner $E_{LR}$ of the housing 56 and the first slot edge 38a are limited by contact with the interior object $F_2$ relative to deformation related movement of the lower rear edge 38b of the slot 38 of the inner door panel 32.

Second Embodiment

Figure 18:
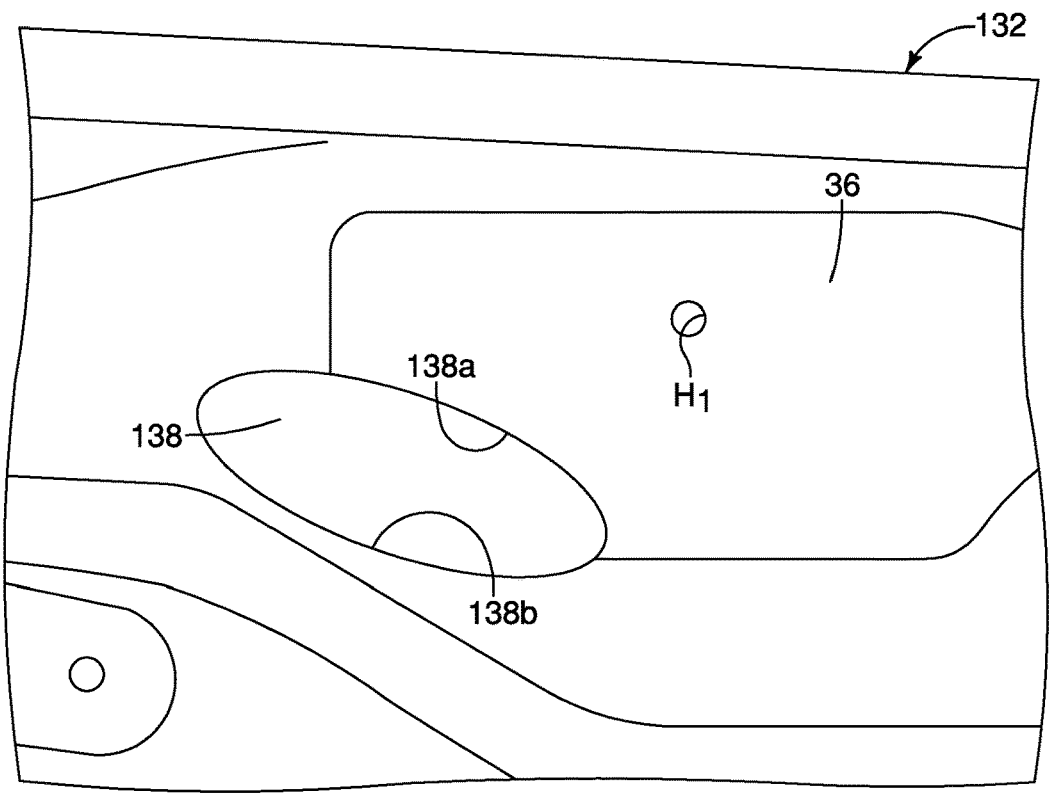
FIG. 18 is a side view of a portion of an interior side of an inner door panel showing an interior latch handle attachment area (an interior area) and an attenuation slot in accordance with a second embodiment.
Figure 19:
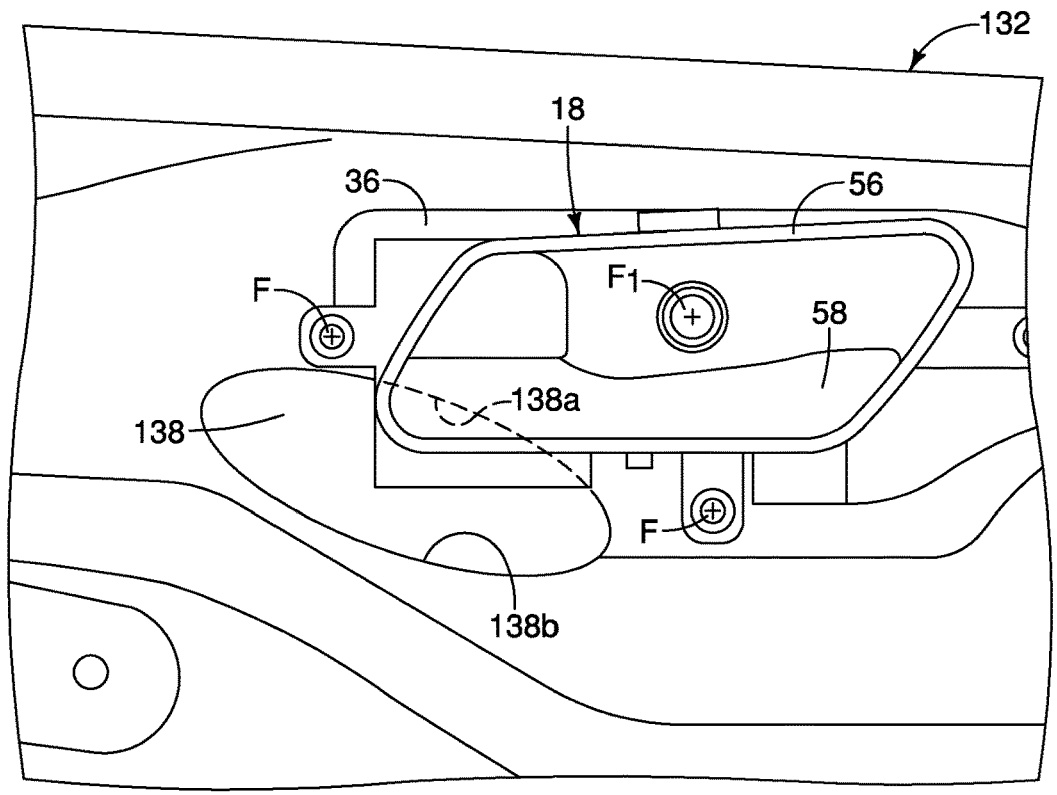
FIG. 19 is another side view of the portion of the interior side of the inner door panel similar to FIG. 18 showing an interior latch handle installed to the interior latch handle attachment area (the interior area) and the attenuation slot in accordance with the second embodiment.

Referring now to FIGS. 18 and 19, an inner door panel 132 with an attenuation slot 138 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the inner door panel 32 of the first embodiment is replaced with the inner door panel 132. The inner door panel 132 is identical to the inner door panel 32 of the first embodiment, except that the slot 38 of the first embodiment is replaced with the attenuation slot 138 of the second embodiment.

The attenuation slot 138 is formed in the inner door panel 132 in generally the same location as the attenuation slot 38 of the first embodiment. Specifically, the attenuation slot 138 is located at a lower rearward corner of the inboard area 36.

The attenuation slot 138 has an oval or elliptical shape that is rotated slightly such that a rear end thereof is higher than a front end thereof. The attenuation slot 138 defines a deformation brake line with the same properties as the attenuation slot 38 of the first embodiment.

Third Embodiment

Figure 20:
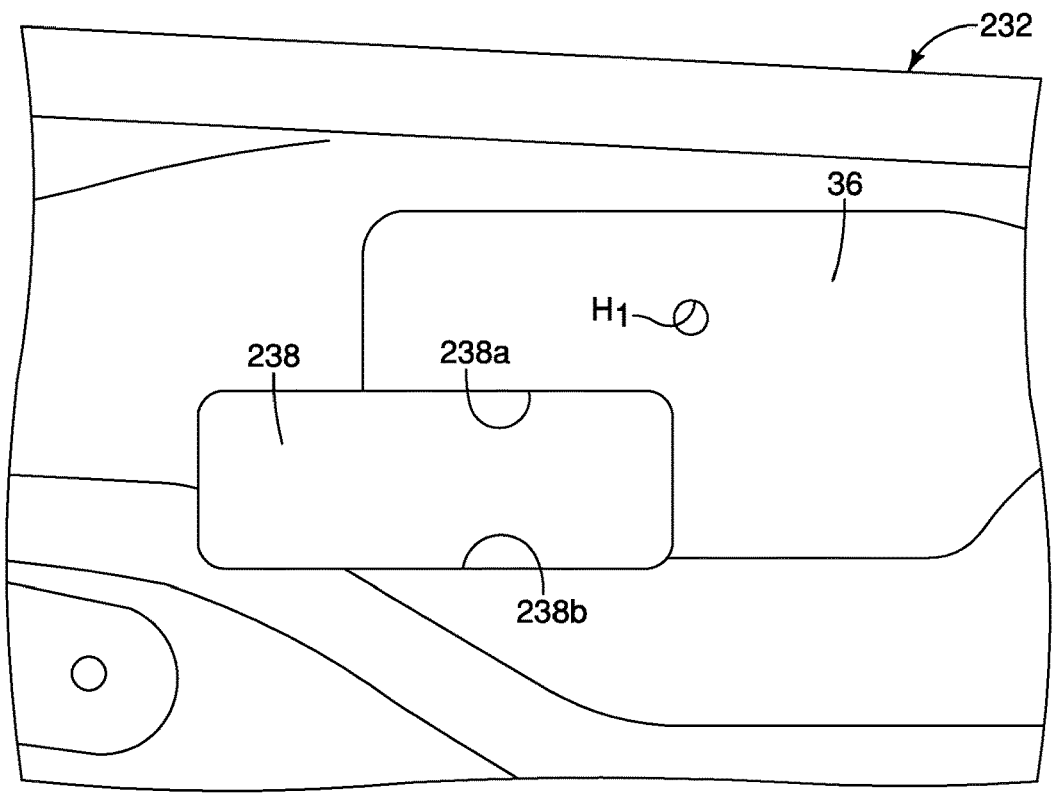
FIG. 20 is a side view of a portion of an interior side of an inner door panel showing an interior latch handle attachment area (an interior area) and an attenuation slot in accordance with a third embodiment.
Figure 21:
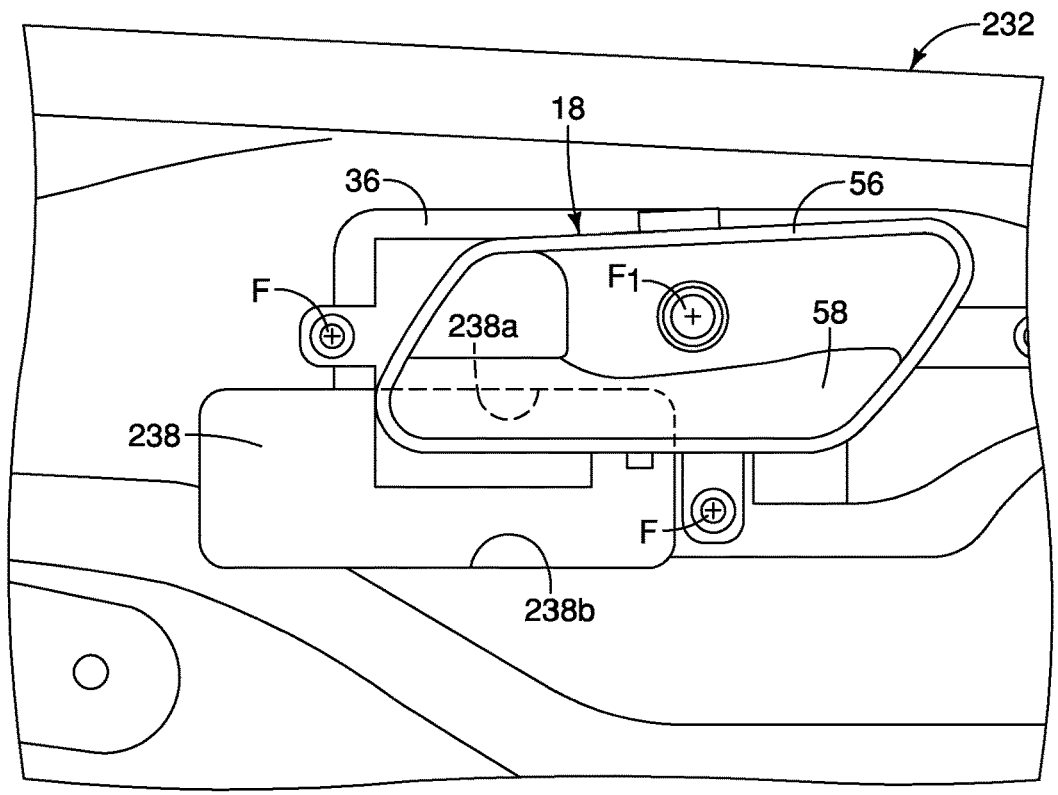
FIG. 21 is another side view of the portion of the interior side of the inner door panel similar to FIG. 20 showing an interior latch handle installed to the interior latch handle attachment area (the interior area) and the attenuation slot in accordance with the third embodiment.

Referring now to FIGS. 20 and 21, an inner door panel 232 with an attenuation slot 238 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the inner door panel 32 of the first embodiment is replaced with the inner door panel 232 of the third embodiment. The inner door panel 232 is identical to the inner door panel 32 of the first embodiment, except that the slot 38 of the first embodiment is replaced with the attenuation slot 238 of the third embodiment.

The attenuation slot 238 is formed in the inner door panel 232 in generally the same location as the attenuation slot 38 of the first embodiment. Specifically, the attenuation slot 238 is located at a lower rearward corner of the inboard area 36 of the inner door panel 32.

The attenuation slot 238 has a rectangular shape with curved corners. The attenuation slot 238 defines a deformation brake line with the same properties as the attenuation slot 38 of the first embodiment.

The structural elements of the vehicle 10 (other than the inner door panels 32, 132 and 232) are conventional components that are well known in the art. Since such structural elements are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
a door structure configured to attach to a vehicle and move to and from each of a closed orientation covering a door opening of the vehicle and an open orientation exposing the door opening when attached to the vehicle, the door structure having an inner door panel defining an interior latch handle attachment area and an attenuation slot adjacent to the interior latch handle attachment area, the attenuation slot being defined between a first slot edge and a second slot edge; and
an interior latch handle installed to the interior latch handle attachment area of the inner door panel with a portion of the interior latch handle being located adjacent to the first slot edge of the attenuation slot such that with the door structure in a non-deformed state the interior latch handle is in a generally upright orientation and the first slot edge is adjacent to the second slot edge, and, in response to an impact event proximate a central area of the door structure, the door structure and the interior latch handle attachment area deform such that the first slot edge and the interior latch handle move relative to the second slot edge of the attenuation slot.

2. The vehicle body structure in accordance with claim 1, wherein
the attenuation slot has an overall L-shape as viewed from an inboard side of the inner door panel.

3. The vehicle body structure in accordance with claim 1, further comprising:
a passenger compartment structure having at least an A-pillar and a B-pillar partially defining a passenger compartment, the door structure being installed for pivotal movement to the A-pillar, an interior object being located adjacent the interior latch handle and spaced apart therefrom with the door structure in a closed orientation and in the non-deformed state, and, in response to the impact event deformation of the door structure moves a rearward area of the interior latch handle into contact with the interior object causing the rearward area to resist further inboard movement and a forward area of the interior latch handle to continue experiencing inboard movement.

4. The vehicle body structure in accordance with claim 3, wherein
the door structure is configured such that in response to the impact event with the interior object contacting the rearward area of the interior latch handle, the first slot edge undergoes limited inboard movement while the second slot edge continues inboard movement.

5. The vehicle body structure in accordance with claim 4, wherein
the door structure is further configured such that in response to the impact event with the interior object contacting the rearward area of the interior latch handle, an upper rearward portion of the interior latch handle can move in an inboard direction and a lower rearward portion of the interior latch handle undergoes limited inboard movement.

6. The vehicle body structure in accordance with claim 5, wherein
the door structure is further configured such that in response to the impact event with the interior object contacting the rearward area of the interior latch handle, a forward portion of the interior latch handle can move in an inboard direction and the rearward portion of the interior latch handle undergoes limited inboard movement.

7. The vehicle body structure in accordance with claim 3, wherein
the door structure is further configured such that in response to the impact event with the interior object contacting the rearward area of the interior latch handle, an upper rearward portion of the interior latch handle can move in an inboard direction and further inboard movement of a lower rearward portion of the interior latch handle is limited by contact with the interior object.

8. The vehicle body structure in accordance with claim 7, wherein
the door structure is further configured such that in response to the impact event with the interior object contacting the rearward area of the interior latch handle, a forward portion of the interior latch handle can move in an inboard direction and the rearward portion of the interior latch handle undergoes limited inboard movement.

9. The vehicle body structure in accordance with claim 8, wherein
the door structure is configured such that in response to the impact event with the interior object contacting the rearward area of the interior latch handle, the first slot edge undergoes limited inboard movement while the second slot edge can continue inboard movement.

10. The vehicle door assembly according to claim 1, wherein
the inner door panel has a main panel portion, a forward section extending vertically along a forward end of the main panel portion and a rearward section extending along a rearward end of the main panel portion with a hollow interior of the door structure being at least partially defined along the main panel portion between the forward section and the rearward section.

11. The vehicle door assembly according to claim 10, wherein
the interior latch handle is installed to an upper area of the main panel portion inboard of the hollow interior.

12. A vehicle body structure, comprising:
a passenger compartment structure having at least a first pillar and a second pillar partially defining a passenger compartment, the first pillar and the second pillar defining a door opening therebetween;
a door structure configured to attach to the first pillar for movement to and from a closed orientation covering the door opening and an open orientation exposing the door opening and the passenger compartment, the door structure having an inner door panel defining an interior latch handle attachment area and an attenuation slot adjacent to the interior latch handle attachment area, the attenuation slot being defined between a first slot edge and a second slot edge; and
an interior latch handle installed to the interior latch handle attachment area of the inner door panel with a portion of the interior latch handle being located adjacent to the first slot edge of the attenuation slot such that with the door structure in a non-deformed state the interior latch handle is in a generally upright orientation and the first slot edge is adjacent to the second slot edge, and, in response to an impact event proximate a central area of the door structure, the door structure and the interior latch handle attachment area deform such that the first slot edge and the interior latch handle move relative to the second slot edge of the attenuation slot.

13. The vehicle body structure in accordance with claim 12, wherein
the door structure is configured such that in response to the impact event movement in the inboard direction of the interior latch handle is limited by contact with an interior object while the second slot edge can continue inboard movement.

14. The vehicle body structure in accordance with claim 13, wherein
the door structure is further configured such that in response to the impact event with the interior object contacting the rearward area of the interior latch handle, an upper rearward portion of the interior latch handle can move in an inboard direction and a lower rearward portion of the interior latch handle undergoes limited inboard movement.

15. The vehicle body structure in accordance with claim 14, wherein
the door structure is further configured such that in response to the impact event with the interior object contacting the rearward area of the interior latch handle, a forward portion of the interior latch handle can move in an inboard direction and the rearward portion of the interior latch handle undergoes limited inboard movement.

16. The vehicle body structure in accordance with claim 12, wherein
the door structure is further configured such that in response to the impact event with the interior object contacting the rearward area of the interior latch handle, an upper rearward portion of the interior latch handle can move in an inboard direction and further inboard movement of a lower rearward portion of the interior latch handle is limited by contact with the interior object.

17. The vehicle body structure in accordance with claim 16, wherein
the door structure is further configured such that in response to the impact event with the interior object contacting the rearward area of the interior latch handle, a forward portion of the interior latch handle can move in an inboard direction and inboard movement of the rearward portion of the interior latch handle is limited by contact with the interior object.

18. The vehicle body structure in accordance with claim 17, wherein
the door structure is configured such that in response to the impact event with the interior object contacting the rearward area of the interior latch handle, the first slot edge undergoes limited inboard movement while the second slot edge can continue inboard movement.

* * * * *